United States Patent [19]
Gilchrist

[11] Patent Number: 5,918,570
[45] Date of Patent: *Jul. 6, 1999

[54] DEAERATED FEEDWATER SUPPLY SYSTEM FOR A BOILER SYSTEM AND A METHOD FOR DEAERATING BOILER FEEDWATER

[75] Inventor: Patrick J. Gilchrist, Poughkeepsie, N.Y.

[73] Assignee: Greenwich Hospital, Greenwich, Conn.

[ * ] Notice: This patent issued on a continued prosecution application filed under 37 CFR 1.53(d), and is subject to the twenty year patent term provisions of 35 U.S.C. 154(a)(2).

[21] Appl. No.: 08/964,653

[22] Filed: Nov. 5, 1997

[51] Int. Cl.⁶ .................................................. F22D 5/26
[52] U.S. Cl. ........................................ 122/452; 122/451 R
[58] Field of Search .................................. 122/451 R, 452, 122/489, 406.1, 406.2, 406.3, 406.4, 407, 414

[56] References Cited

U.S. PATENT DOCUMENTS

| | | |
|---|---|---|
| 1,255,170 | 2/1918 | Jacobus . |
| 1,806,371 | 5/1931 | Spyer . |
| 3,362,132 | 1/1968 | Schellenberg . |
| 3,572,588 | 3/1971 | Hamilton, Jr. ........................ 237/9 R |
| 3,938,588 | 2/1976 | Coit et al. ............................. 122/441 |
| 4,121,913 | 10/1978 | Spevack . |
| 4,268,280 | 5/1981 | Fuji et al. . |
| 4,352,680 | 10/1982 | Hackler . |
| 4,385,908 | 5/1983 | Carmichael ........................... 122/489 |
| 4,444,571 | 4/1984 | Matson . |
| 4,582,027 | 4/1986 | Cuscino et al. ....................... 122/452 |
| 4,679,529 | 7/1987 | Mancel . |
| 4,874,406 | 10/1989 | Bekedam ................................. 55/198 |
| 5,129,366 | 7/1992 | Chikamori et al. ................. 122/451 R |
| 5,152,252 | 10/1992 | Bolton et al. . |
| 5,203,286 | 4/1993 | Youssef . |
| 5,213,065 | 5/1993 | Wilson et al. . |
| 5,389,126 | 2/1995 | Baker et al. . |
| 5,575,244 | 11/1996 | Dethier . |
| 5,728,200 | 3/1998 | Bekedam ................................. 96/158 |

Primary Examiner—Teresa J. Walberg
Assistant Examiner—Gregory A. Wilson
Attorney, Agent, or Firm—Cummings & Lockwood

[57] ABSTRACT

A deaerated feedwater supply system for a boiler system includes a water supply conduit configured to provide a supply of water to a deaerator tank and a deaerated makeup water conduit configured to convey deaerated makeup water from the deaerator tank to a surge tank at an elevation in the surge tank below the surface of deaerated feedwater contained therein. A heat exchanger is provided for exchanging heat from deaerated makeup water in the deaerated makeup water conduit to the water in the water supply conduit so that the water is heated prior to entering the deaerator tank and the deaerated makeup water is cooled upon entry into the surge tank. Polypropylene spheres are provided within the surge tank for reducing oxygen absorption into deaerated feedwater. A deaerated feedwater conduit is configured to convey deaerated feedwater from the surge tank to the boiler. And a condensate return conduit is configured to convey condensate return from the boiler to the surge tank at an elevation in the surge tank below the surface of deaerated feedwater contained therein.

33 Claims, 4 Drawing Sheets

DEAERATED FEEDWATER SUPPLY SYSTEM FOR A BOILER SYSTEM AND A METHOD FOR DEAERATING BOILER FEEDWATER

BACKGROUND OF THE INVENTION

1. Field of the Invention

The subject invention relates to the deaeration of water in a boiler system. More particularly, this invention involves increasing overall boiler efficiency by reducing the temperature of boiler feedwater before the feedwater enters a boiler flue gas economizer.

2. Background of the Related Art

It is well known that dissolved oxygen must be removed from boiler system feedwater to prevent corrosion of steel surfaces that come in contact with the feedwater such as boiler tubes, surge tanks, and connecting conduits. Oxygenated feedwater also causes the formation of iron oxide deposits on the surfaces of the boiler tubes which restrict the flow of feedwater therethrough and consequently, reduces the transfer of heat to the water passing through the boiler.

Fresh water at 55° F. has an oxygen content of approximately 10 ppm. It is preferable to reduce the oxygen content in boiler feedwater to 0.007 ppm or less, thereby maintaining the heat transfer characteristics of the boiler system and reducing maintenance costs.

A method well known in the art for removing oxygen from feedwater, also called feedwater deaeration, is to raise the temperature of the feedwater to its boiling point so that the oxygen will degas from solution. Feedwater deaeration may be accomplished with this method by passing the feedwater through a deaerator nozzle in which pressurized steam and feedwater are mixed together to cause oxygen to separate from the feedwater. The deaerated feedwater is then collected in a pressurized enclosure while the oxygen is removed by the steam as it exits the enclosure through a vent. The diameter of the orifice in the vent is selected to allow all of the oxygen to be removed while sustaining a sufficient back pressure in the tank. A method of deaerating water in a similar manner is disclosed in U.S. Pat. No. 3,362,132 to Schellenberg.

A conventional deaerator system includes a deaerator tank, as described above, and an unpressurized vented surge tank for collecting boiler condensate. Fluid flows in a loop through these components to continually supply deaerated feedwater to the remainder of a boiler system in a manner that will be described hereinbelow. Water is added to the surge tank as necessary to make up for lost fluid and thereby maintain the level of fluid in the boiler system.

The flow of fluid through a boiler system that includes a conventional deaerator system, a flue gas economizer, a boiler, and load components such as, for example, room heaters, autoclave equipment, and laundry equipment, operates as follows. Hot deaerated feedwater (approximately 227° F.) is pumped by a boiler feed pump from a pressurized deaerator tank to a flue gas economizer for preheating. The solution then travels to the boiler and is transformed to steam. The steam then travels to the load components. Some load components lose steam to the atmosphere by venting. Losses also occur through system leaks. Typically, 20% to 30% of feedwater is lost as it circulates through a boiler system. Thereafter the steam condenses.

The condensed feedwater then returns to the vented surge tank of the deaerator system. Relatively cool makeup water, which is typically softened tap water at approximately 55° F., is added to the feedwater in the surge tank to replace the feedwater that was lost due to venting and leaks. Because the surge tank is vented to the atmosphere and oxygen rich makeup water has been added to the surge tank, the solution in the tank becomes oxygenated. Thereafter, the oxygenated feedwater is pumped to the deaerator tank.

All of the fluid that is pumped to the deaerator tank is then deaerated as it passes the deaerator nozzle and enters the tank. The hot deaerated feedwater, the temperature of which is again raised to approximately 227° F., then starts the cycle again as it is pumped by the boiler feed pump from the deaerator tank to the flue gas economizer. A deaerator system for a boiler similar to the conventional system described above is disclosed in U.S. Pat. No. 5,129,366 to Chikamori, et al.

There are several disadvantages associated with the prior art deaerator system described above. For example, the high temperature of the deaerated feedwater pumped directly from the deaerator tank to the flue gas economizer provides a relatively small differential feedwater temperature across the flue gas economizer. It is readily understood by those skilled in the art that boiler efficiency gains are obtained with flue gas economizers by developing a differential temperature between the feedwater inlet and the feedwater outlet. The greater the differential temperature therebetween, the greater the efficiency gain. Therefore, prior art deaerator systems allow only marginal efficiency gains when used with flue gas economizers in a boiler system.

Another disadvantage is that both the makeup water and the deaerated condensate return must be deaerated continuously. This is because the condensate return becomes oxygenated after entering the vented surge tank as it is exposed to the air in the tank and mixed with the oxygen rich makeup water fed into the tank. Also, inasmuch as there is oxygen mixed into the fluid in the surge tank, the tank and conduits connecting the surge tank to the deaerator tank corrode prematurely.

An additional disadvantage is that boiler feedwater pumps in prior art systems fail prematurely since the hot deaerated feedwater that flows through the pumps tend to induce cavitation. Cavitation leads to pitting in the pump impeller—causing seal and bearing failure.

Yet another disadvantage associated with conventional deaerator systems involves the use of high efficiency hot water heaters. Such heaters are designed to extract heat energy from boiler steam in excess of that extracted by standard hot water systems. Consequently, the condensate return coming from a high efficiency hot water heater system is cooler. This apparent gain in efficiency, however, is lost when the cooler condensate return is reheated in the deaerator nozzle, since the deaerator must utilize a greater amount of energy to reheat the cooler condensate to 227° F. In addition, the increase in boiler efficiency that could have been had by providing the cooler feedwater to the evaporator—and thus increasing the differential temperature across the evaporator—is lost because the cooler feedwater in prior art deaerator system is pumped to the deaerator and not the evaporator.

Clearly there is a need in the art for a deaerated water supply system that increases the differential temperature across a flue gas economizer so as to improve boiler efficiency. There is also a clear need for a deaerator system in which feedwater is not continuously deaerated.

SUMMARY OF THE INVENTION

The subject invention is directed to a novel deaerated feedwater supply system for a boiler system and a method for deaerating boiler feedwater that eliminates the disadvantages of the prior art while providing the same benefits afforded thereby. Preferred embodiments of the invention may be employed in boiler systems installed in facilities such as, for example, hospitals, manufacturing plants, and office buildings.

In accordance with a preferred embodiment of the subject invention, the boiler deaerated feedwater supply system includes a water supply conduit operatively configured for providing a supply of water to a deaerator tank. A deaerated makeup water conduit is configured to convey deaerated makeup water from the deaerator tank to a surge tank at an elevation below the surface of deaerated feedwater contained therein so that deaerated makeup water doesn't have to be pumped (gravity fed). The surge tank is vented to the atmosphere.

A heat exchanger transfers heat from deaerated makeup water conveyed through the deaerated makeup water conduit to water conveyed through the water supply conduit. The exchanger ensures that the water entering the deaerator tank is heated and the deaerated makeup water entering the surge tank is cooled.

A multiplicity of polypropylene spheres float on the surface of the deaerated feedwater in the surge tank to create a barrier between the feedwater and the oxygen rich air above the feedwater. Using one layer of three-quarter inch diameter spheres creates a barrier covering up to 91% of the deaerated feedwater surface area.

The level of the feedwater in the surge tank and deaerator tank is automatically maintained to within certain levels. During refilling, the water conveyed through the water supply conduit and the deaerated makeup water conveyed through the deaerated makeup water conduit flow simultaneously through the heat exchanger so that optimal heat transfer occurs between the supply water and the deaerated water.

A deaerated feedwater conduit is in fluid communication with a flue gas economizer for providing feedwater thereto. The economizer is attached to a boiler and is configured to reheat the feedwater with boiler flue gasses after the gases have passed through the boiler. The preheated feedwater is then conveyed to the boiler.

The boiler feedwater heats until it converts to steam which is then utilized in a hot water heater and various other load components in the facility. A condensate return conduit is operatively configured to convey condensate return from the load components to the surge tank at an elevation below the surface of the deaerated feedwater contained therein so that condensate return from the boiler is not exposed to oxygen.

These and other features of the subject invention will be made more readily apparent to those having ordinary skill in the art from the following detailed description of the invention taken in conjunction with the accompanying drawings.

BRIEF DESCRIPTION OF THE DRAWINGS

So that those having ordinary skill in the art to which the subject invention appertains will more readily understand how to make and use the improved deaerated feedwater supply system and the improved method for deaerating boiler feedwater described herein, preferred embodiments of the invention will be described in detail hereinbelow with reference to the drawings wherein.

DETAILED DESCRIPTION OF THE PREFERRED EMBODIMENTS

Figure 1:
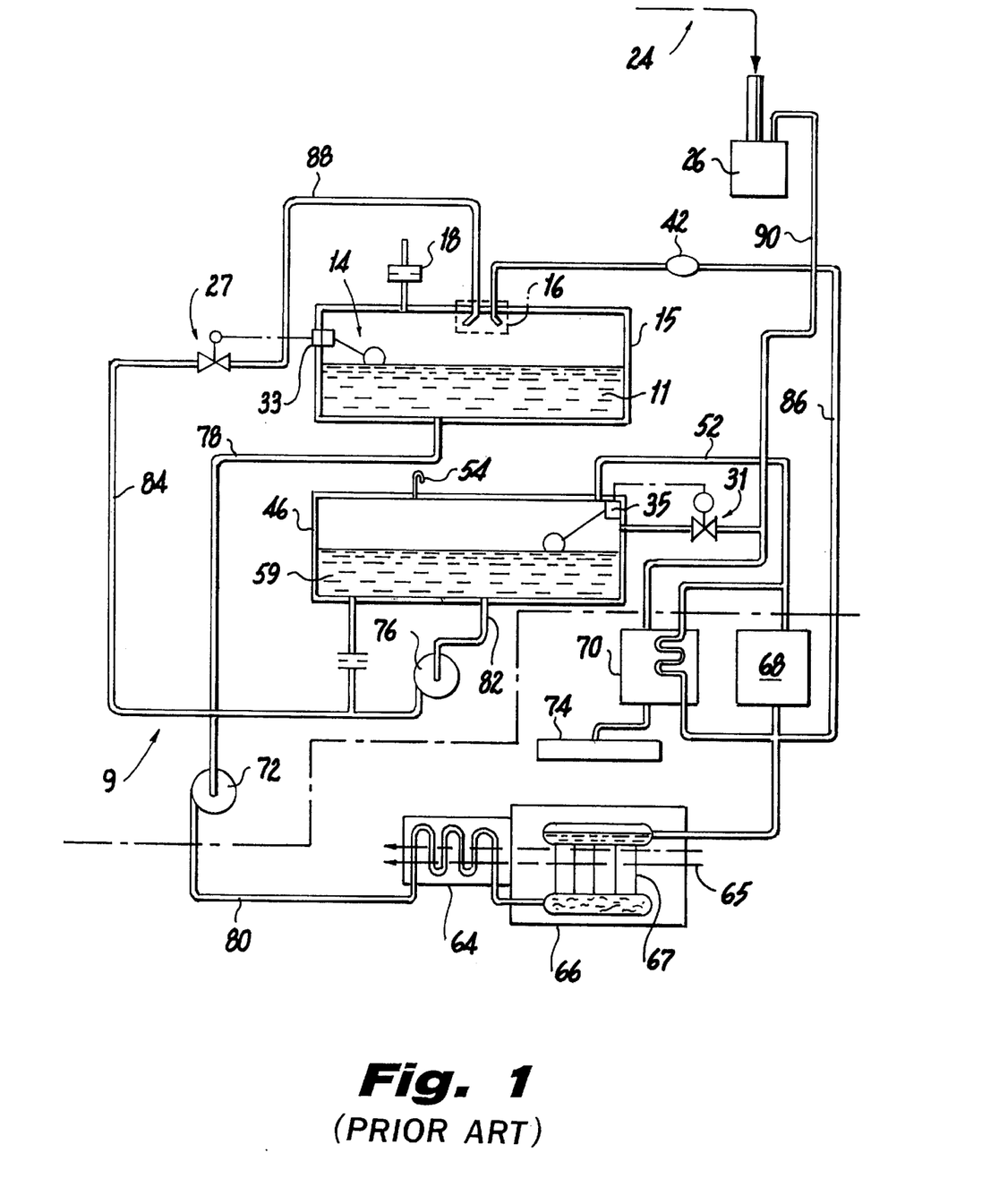
FIG. 1 is a schematic diagram of an inefficient prior art boiler system wherein both the makeup water and the feedwater pass through the deaerator tank.

Referring now to the drawings wherein like reference numerals identify similar structural elements of the subject invention, there is illustrated in FIG. 1 a boiler system including a prior art deaerated feedwater supply system shown generally by reference numeral 9 in fluid communication with a flue gas economizer 64, a boiler 66, a hot water heater 70 and various other load components 68. To better understand the improvements provided by the subject invention over the prior art, a detailed description of the prior art deaerated feedwater supply system 9 is included, followed by a detailed description of the preferred embodiments of the subject invention. The prior art deaerator system and preferred embodiments of the deaeration systems of the subject invention are described hereinbelow in fluid communication with identical economizers, boilers, hot water heaters, and various other load components.

With reference to FIG. 1, a boiler system having a prior art deaerated feedwater supply system includes a boiler feed pump 72 in fluid communication with the flue gas economizer 64 through a conduit 80. The economizer 64 is attached to the boiler 66 and is adapted to cause the feedwater to extract latent heat energy remaining in flue gases 65 after the gases pass the boiler tubes 67 of the boiler 66. The boiler 66 is in fluid communication with the hot water heater 70 and various other steam load components 68. In most boiler system applications, the hot water heater 70 places the largest single load on the boiler 66 utilizing as much as 60% of the steam output. The hot water heater 70 is supplied with fresh water 24 that may include a water softener unit 26 and whose heated water supplies a variety of plant uses 74. The various other load components 68 include, for example, compartment heater coils, process equipment, and laundry equipment. The hot water heater 70 and the other load components 68 are in fluid communication with a surge tank 46 of the deaerated feedwater supply system 9 by way of condensate return line 52.

The prior art deaerated feedwater supply system 9 includes the surge tank 46 for the temporary storage of feedwater. The fresh water supply 24 is in fluid communication with the surge tank 46 through conduit 90. The water is added as necessary to the feedwater in the surge tank 46 to 'make up' for feedwater that is lost through the various load components 68 and 70. The makeup water is fed to the surge tank 46 through a surge tank filler valve 31 that is activated by a surge tank float 35 when the level of the tank falls below a preset lower limit. The makeup water may also be treated by the water softening unit 26 to reduce the hardness and, thereby reduce the mineral buildup in the boiler system. A surge tank vent 54 is provided in the top of the surge tank 46 to maintain the volume above the fluid in the tank at atmospheric pressure.

The surge tank 46 is in fluid communication with the a deaerator tank 15 through conduits 82, 84, and 88. A deaerator tank feed pump 76 is disposed between conduit 82 and 84 for pumping fluid from the surge tank 46; through conduits 82, 84, and 88; and into the deaerator tank 15. A deaerator tank filler valve 27 is between conduits 84 and 88. A deaerator tank float 33 signals the deaerator tank filler valve 27 to open when the volume of fluid in the deaerator tank 15 is low, and signals the filler valve 27 to close when the tank 15 is nearly full.

A deaerator nozzle 16 is disposed between conduit 88 and the deaerator tank 15 for causing steam to heat and degas the fluid as it passes through the nozzle 16. The boiler 66 provides steam to the nozzle 16 through a conduit 86. The boiler steam pressure is regulated to approximately 5 psi (0.34 bar) with a pressure regulator 42 located in conduit 86. The makeup water heats to approximately 227° F. (108° C.) as it passes through the nozzle 16. A vent orifice 18 is provided in the top of the deaerator tank 15 for venting off oxygen removed from the water and provides sufficient back pressure to maintain a steam blanket in the volume above the fluid at 5 psi (0.34 bar). The deaerator tank 15 is in fluid communication with the boiler feed pump 72 through a conduit 78.

With continuing reference to FIG. 1, in operation, hot deaerated feedwater 11 is pumped by the boiler feed pump 72 from the deaerator tank 15 to the flue gas economizer 64. The temperature of the deaerated feedwater increases slightly as it passes the flue gases in the economizer 64. The fluid then travels to the boiler 66 and is converted to steam. The steam travels from the boiler 66, to the hot water heater 70 and other various load components 68, and thereafter condenses. The condensate returns to the surge tank 46 through the condensate return line 52. Oxygen rich makeup water is added to the feedwater in the surge tank 46 to maintain a desirable level of fluid in the tank. Because the makeup water and fluid in the tank 46 is exposed to the air in the tank 46, the fluid in the tank becomes oxygenated. The combined feedwater and makeup water 59 in the surge tank 46 is then pumped by the deaerator tank feed pump 76 to the deaerator tank 15 when the deaerator tank filler valve 27 is in the open position. The water is deaerated as it passes the deaerator nozzle 16 and enters the deaerator tank 15. The hot deaerated feedwater then starts the cycle again when it is pumped by the boiler feed pump 72 from the deaerator tank 15 to the flue gas economizer 64.

Figure 2:
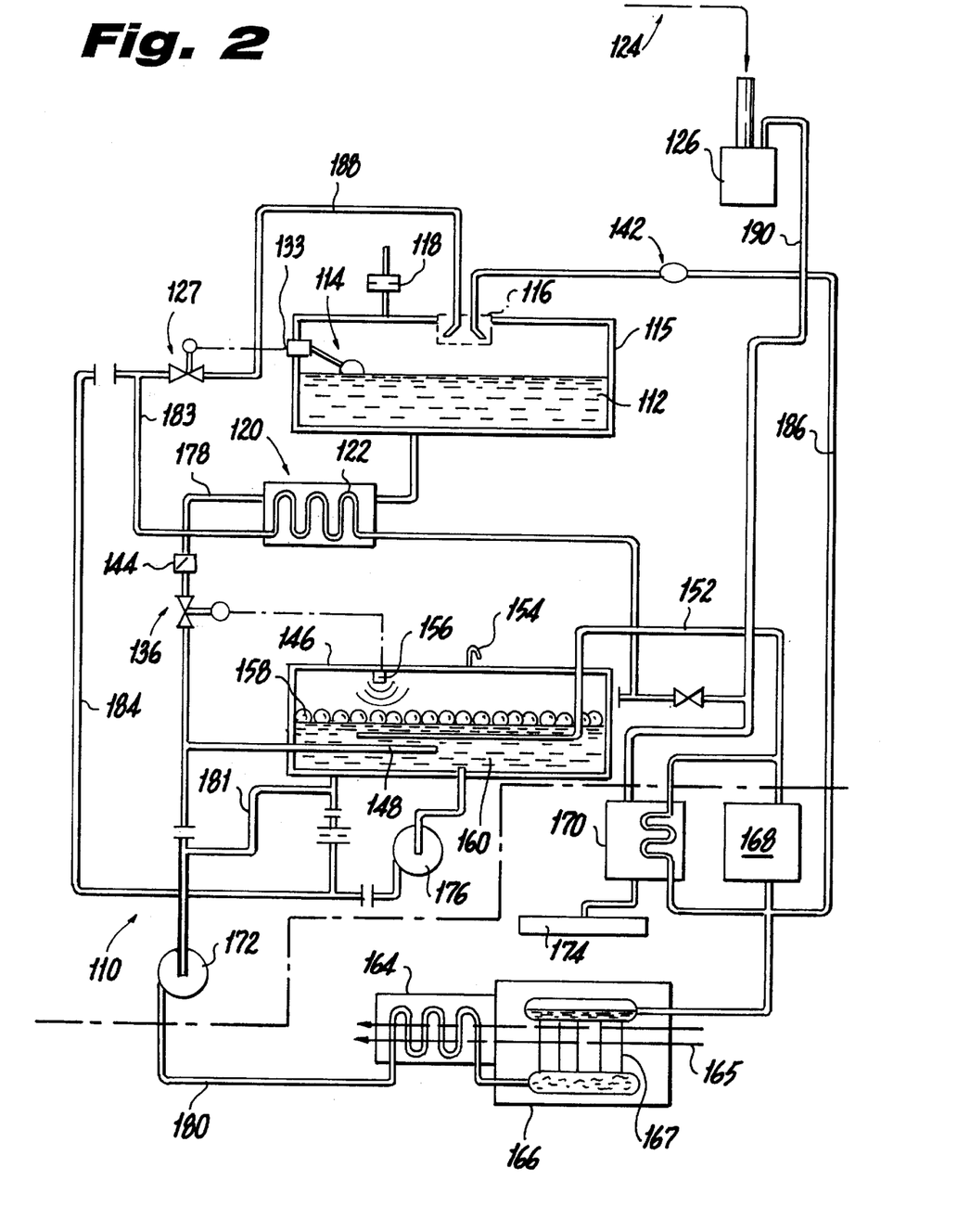
FIG. 2 is a schematic diagram of a boiler system modified to include a preferred embodiment of subject invention wherein only the makeup water passes through the deaerator and a regenerative heat exchanger is included between the water supply conduit and deaerated makeup water conduit.

Referring now to FIG. 2, there is illustrated a boiler system similar to that which is illustrated in FIG. I but modified to include improvements afforded by a preferred embodiment of subject invention. The boiler system includes a flue gas economizer 164, boiler 166, and steam load components 168 and 170 that are identical in construction and operation to the flue gas economizer 64, boiler 66, and steam load components 68 and 70, respectively, shown in FIG. 1 and described herein above. The preferred embodiment of the deaerated water supply system which is referred to generally by reference numeral 110, provides deaerated fluid to the economizer 164, boiler 166, and load components 168 and 170. Several of the major components found in the deaerator system 110 are the same as the corresponding components of the prior art deaerated water supply system designated by numeral 9 and illustrated in FIG. 1. However, as will be detailed in the description provided below, improvements have been included to eliminate the numerous disadvantages associated with that prior art system.

Among these improvements is the closed loop circulation of feedwater between the surge tank 146 and the economizer 164, boiler 166, and load components 168 and 170. The closed loop circulation of feedwater eliminates repeated deaeration of previously deaerated feedwater, conserving the steam required to continuously deaerate the feedwater, and thereby improving the efficiency of the system.

In addition, a counter flow heat exchanger 120 is included to heat relatively cool water supplied by the water supply 124 prior to the passage thereof through the deaerator nozzle 116 to the deaerator tank 115 and cools deaerated makeup water prior to flowing into the surge tank 146. These modifications result in significant efficiency gains as described hereinbelow.

Referring to FIG. 2, a boiler feed pump 172 of the deaerated water supply system 110 is in fluid communication with the flue gas economizer 164. The economizer 164 is attached to the boiler 166 and is adapted to cause the feedwater to extract latent heat energy remaining in flue gases 165 after the gases have passed the boiler tubes 167 in the boiler 166. The economizer 164 is in fluid communication with the boiler. The boiler 166 is then in fluid communication with a hot water heater 170 and various other steam load components 168. A fresh water supply 124 supplies water to the hot water heater 170 that, in turn, supplies a variety of plant uses 174. A condensate return conduit 152 provides fluid communication between the load components 168 and 170 and a surge tank 146 of the deaerated water supply system 110.

A condensate return distribution pipe 151 is in fluid communication with the condensate return conduit 152. The distribution pipe 151 is positioned inside the surge tank 146 below the surface of a volume of deaerated feedwater 160 contained therein. A surge tank vent 154 is provided in the top of the surge tank 146 for maintaining the air volume above the feedwater 160 in the tank 146 at atmospheric pressure.

At least one layer of floating spheres 158 float on the surface of the deaerated feedwater 160 located in the surge tank 146. The spheres provide a barrier between the feedwater and the volume of air above the feedwater—thereby preventing oxygen absorption into the feedwater. The spheres are ¾ inch (1.9 cm) in diameter and made of polypropylene. The spheres adapt to any water level and withstand up to 230° F. (110° C.). A single layer of spheres covers 91% of the feedwater surface area. Two layers of spheres covers greater than 99% of the feedwater surface area and prevent a proportional amount of oxygen absorption. It is envisioned that an alternative oxygen absorption barrier between the feedwater and the volume of air above the feedwater may be provided. For example, such a barrier may compose of a sustained inert gas layer having a density greater than air or a flexible membrane configured to fit within the tank on the surface of the feedwater.

The water supply 124 provides makeup water to the deaerator tank 115 of the boiler system through conduits 190, 183 and 188. The makeup water may be treated by a water softening unit 126 to reduce the hardness and thereby reduce mineral buildup in the boiler system. Conduit 183 includes heat exchanger tubes 122 enclosed in a counter flow heat exchanger 120. A deaerator tank filler valve 127 is located between conduits 183 and 188. A deaerator tank float 133 is attached to and extends onto the deaerator tank 115. The tank float 133 signals the tank filler valve 127 to open when the fluid in the tank 115 falls below a predetermined level and signals the filler valve to close when the tank is nearly full.

A deaerator nozzle 116 is located between conduit 188 and the deaerator tank 115 for causing steam to degas the makeup water as it enters the tank 115. The boiler 166 is in fluid communication with the deaerator nozzle 116 through conduit 186. A pressure regulator 142 is included in conduit 186 for reducing the steam pressure prior to entering the deaerator nozzle 116 to approximately 5 psi (3.4 bar). The steam passing through the deaerator nozzle 116 heats and degasses the makeup water as it passes from conduit 188 to the deaerator tank 115. The makeup water heats to approximately 227° F. (108° C.). A reduced diameter vent orifice 118 is provided in the top of the deaerator tank 115 for venting off oxygen that is degassed from the fluid, and for providing sufficient back pressure to maintain the steam blanket in the volume above the deaerated fluid in the tank. The diameter of the vent orifice is reduced because only the makeup water requires deaeration. Since makeup water accounts for only approximately 20% of the total fluid passing through the system, 80% less steam escapes from the tank. The deaerator tank 115 is located above the surge tank 146 so that the fluid in the deaerator tank is gravity feed into the surge tank 146 in a manner that will be described below.

The deaerator tank 115 is in fluid communication with the surge tank 146 through a conduit 178. Conduit 178 is in fluid communication with a makeup water distribution pipe 148 that is located inside the surge tank 146 and below the surface of the deaerated feedwater 160 contained in the tank. Conduit 178 is in fluid communication with the heat exchanger 120 allowing the hot deaerated makeup water to preheat the relatively cooler makeup water. A flow limiter 144 is also provided in conduit 178 for controlling the fluid flow and preventing back flow. In addition, a surge tank filler valve 136 is included in conduit 178. A capacitance type level detector 156 is operatively connected to and extends onto the surge tank 146. The level detector 156 signals the tank filler valve 136 to move to an open position when the fluid in the tank 146 falls below a preset level and signals the filler valve 136 to move to a closed position when the tank is nearly full.

In operation, deaerated feedwater is pumped by the boiler feed pump 172 from the surge tank 146 to the flue gas economizer 164. The temperature of the deaerated feedwater increases substantially as it passes the flue gases in the economizer 164. The fluid then flows to the boiler 166 and is converted to steam. The steam flows to the hot water heater 170 and other various load components 168 and thereafter condenses. The condensate then returns to the surge tank 146 through the condensate return line 152 and is dispersed below the surface of the deaerated feedwater by the condensate return distribution pipe 151. The polypropylene spheres 158 prevent the feedwater in the tank 146 from becoming oxygenated. The deaerated feedwater then starts the cycle again through the economizer 164, boiler 166 and various load components 168 and 170.

Deaerated makeup water is added to the feedwater in the surge tank to maintain a certain level of fluid in the surge tank 146. Assuming both the deaerator tank filler valve 127 and the surge tank filler valve 136 are open, water from the water supply 124 flows through conduit 190 and is heated in the heat exchanger 120. The water then flows through conduit 183, deaerator tank filler valve 127, and conduit 188. The preheated makeup water is then deaerated as it passes the deaerator nozzle 116 and flows into the deaerator tank 115. Because of the steam blanket maintained over the deaerated makeup water, the makeup water remains deaerated in the tank 115. The deaerated makeup water then flows through conduit 178 in the bottom of the tank 115 and is cooled in the heat exchanger 120. The cooled deaerated makeup water continues through conduit 178, through the surge tank filler valve 136, and is then dispersed below the surface of the deaerated feedwater in the surge tank 146 by the deaerated makeup water distribution pipe 148.

Figure 3:
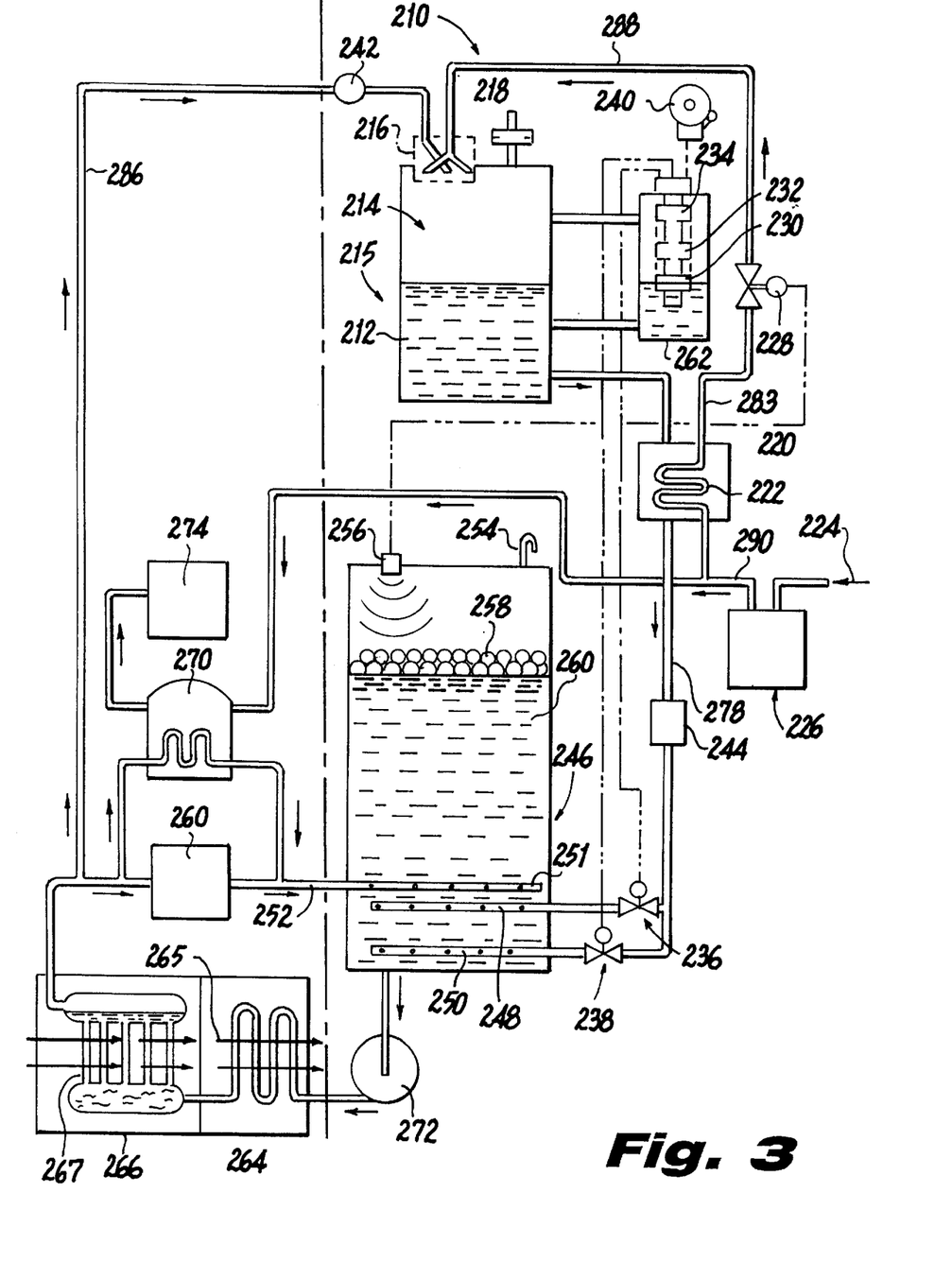
FIG. 3 is a schematic diagram of a boiler system that includes another preferred embodiment of subject invention.

Referring now to FIG. 3, there is illustrated an installation boiler system that includes another improved deaerated feedwater supply system constructed in accordance with a preferred embodiment of the subject invention. The boiler system has a flue gas economizer 264, boiler 266, and steam load components 268 and 270 that are substantially identical in construction and operation to the flue gas economizer, boiler, and steam load components shown in FIGS. 1 and 2 and described hereinabove. The boiler system also includes the novel deaerated water supply system shown generally by reference numeral 210 and used for providing deaerated feedwater to the economizer 264, boiler 266, and load components 268 and 270. The deaerated water supply system 210 operates in a manner substantially similar to the embodiment shown in FIG. 2 and described above.

A boiler feed pump 272 of the deaerated water supply system 210 is in fluid communication with the flue gas economizer 264. The deaerated feedwater travels a path similar to that described above for the economizer, boiler and load components of FIG. 1 and FIG. 2. A condensate return conduit 252 provides fluid communication between the load components 268 and 270 and a surge tank 246 of the deaerated water supply system 210.

A condensate return distribution pipe 251 is in fluid communication with the condensate return conduit 252. The distribution pipe 251 is positioned inside the surge tank 246 and below the surface of a volume of deaerated feedwater 260 contained in the tank 246. A surge tank vent 254 is provided in the top of the surge tank 246 keeping the air above the feedwater 260 in the tank at atmospheric pressure. At least one layer of polypropylene spheres 258 float on the surface of the deaerated feedwater 260 located in the surge tank 246 providing a barrier between the feedwater and the volume of air above the feedwater—thereby preventing oxygen absorption into the feedwater.

The surge tank 246 is taller and narrower than the surge tank of the system shown in FIG. 2. This geometry reduces the surface area of the fluid in the tank, thereby reducing the number polypropylene spheres 258 required to cover the fluid surface and the surface area exposed through the interstices between the spheres. The taller tank 246 also creates a greater net positive suction head for the boiler feed pump 272, reducing or eliminating cavitation in the pump. Yet another benefit is the taller and narrower tank 246 requires less floor space.

A water supply 224 for providing makeup water to the boiler system is in fluid communication with a deaerator tank 215 through conduits 290, 283 and 288. Conduit 283 includes heat exchanger tubes 222 enclosed in a counter flow heat exchanger 220. A valve 228 for filling the deaerator tank is located between conduits 283 and 288. The makeup water may be treated by a water softening unit 226 prior to entering the deaerator tank 215.

The deaerator tank 215 is sized approximately 80% smaller than the deaerator tank 15 shown in FIG. 1 since only the makeup water—and not the feedwater—must be deaerated. The deaerator tank 215 is located above the surge tank 246 so that the fluid in the deaerator tank may gravity feed into the surge tank. It is possible to locate the deaerator tank 215 at the same height or below the surge tank 246, however a transfer pump would then be required to pump the deaerated makeup water from the deaerator tank to the surge tank.

A closed container 262 is in fluid communication through an upper and lower conduit with the deaerator tank 215 and contains three float switches 230, 232, and 234. The switches may be, for example, magnetically activated reed type switches such as the miniature vertical liquid level switch, model number M9000, available from the Madison Company of Branford, Connecticut. The closed container 262 is included to prevent turbulence in the tank 215 from affecting the operation of the switches. An alternative assembly may include, for example, switches located inside the tank with turbulence buffers. Float switches 230 and 232 provide signals for the control of first and second surge tank filler valves 236 and 238, respectively. The filler valves 236 and 238 are opened as the deaerated makeup water in the deaerator tank 215. Switch 234 provides a signal to an alarm 240 warning the operator that a high tank level condition exists and should be corrected.

A deaerator nozzle 216 is fixed to the top of the deaerator tank 215. The boiler 266 is in fluid communication with the deaerator nozzle 216 through conduit 286. A pressure regulator 242 is included in conduit 286 for reducing the steam pressure in conduit 286 prior to reaching the nozzle 216. The makeup water heats to approximately 227° F. (108° C.) and degasses as it passes through the deaerator nozzle 216. A reduced diameter vent orifice 218 is provided in the top of the deaerator tank 215 to vent off oxygen that is degassed from the fluid and provides sufficient back pressure to maintain the steam blanket in the volume above the fluid in the tank 215 at the reduced pressure. Because of the steam blanket above the deaerated makeup water in the surge tank 215, the deaerated makeup water remains at approximately 227° F. (108° C.).

The deaerator tank 215 is in fluid communication with the surge tank 246 through a conduit 278. Conduit 278 is in fluid communication with first and second makeup water distribution pipes 248 and 250 that are located inside the surge tank 246 and below the surface of the deaerated feedwater 260 contained therein. Conduit 278 includes the heat exchanger 220 that has the preheater tubes 222 therein allowing the relatively warmer deaerated makeup water to preheat the relatively cooler makeup water. A flow limiter 244 is also provided in conduit 278 for controlling the fluid flow and preventing back flow. The first and second surge tank filler valves 236 and 238 are included in the first and second makeup water distribution pipes 248 and 250, respectively, for controlling the passage of fluid through the distribution pipes 248 and 250.

A capacitance type level detector 256 is operatively connected to and extends onto the surge tank 246. The level detector 256 signals the deaerator tank filler valve 228 to open when the fluid in the surge tank 246 falls to a lower limit and signals the filler valve 228 to close when the surge tank 246 rises to an upper limit. Because it is important that the condensate return and deaerated makeup water fed to the surge tank 246 are not exposed to the oxygen rich air above the feedwater in the surge tank, the fluid level is not permitted to drop lower than just above the condensate return distribution pipe 251 and makeup water distribution pipes 248 and 250. The fluid level can rise until the polypropylene spheres 258 hit the top of the surge tank 246. Upper and lower feedwater height limits may be set by adjusting when the capacitance level detector 256 signals the deaerator tank filler valve 228.

In operation, deaerated feedwater is pumped by the boiler feed pump 272 from the surge tank 246 to the flue gas economizer 264. After passing through the economizer 264, the fluid is conveyed to the boiler 266. The fluid is converted to steam by the boiler 266 and changes to condensate after passing the various load components 268 and 270 as describe above for the substantially identical configurations of FIGS. 1 and 2.

The condensate then returns to the surge tank 246 through the condensate return line 252 and is dispersed below the surface of the deaerated feedwater by the condensate return distribution pipe 251. The polypropylene spheres 258 prevent the feedwater in the tank 246 from becoming oxygenated. The deaerated feedwater then starts the cycle again through the economizer 264, boiler 266, and various load components 268 and 270 when it is pumped by the boiler feed pump 272 to the flue gas economizer 264.

Assuming that both deaerator tank filler valve 228 and at least the first surge tank filler valve 236 are open, water from the water supply 224 flows through conduit 290 and is heated in the heat exchanger 220. The water then flows through conduit 283, deaerator tank filler valve 228, and conduit 288. The makeup water is then deaerated as it passes the deaerator nozzle 216 and flows into the deaerator tank 215. The oxygenated steam exits from the tank 215 through the reduced diameter vent orifice 218. Because of the steam blanket maintained over the deaerated makeup water, the makeup water remains deaerated in the tank 246. The deaerated makeup water then flows through conduit 278 and is cooled in the heat exchanger 220. The cooled deaerated makeup water continues through conduit 278, the surge tank filler valve 236, and is dispersed below the surface of the deaerated feedwater 260 in the surge tank 246 through the deaerated makeup water distribution pipe 248.

Deaerated makeup water must be added to the feedwater in the surge tank 246 to maintain a certain level of deaerated feedwater in the system. In addition, makeup water passing through the heat exchanger 220 from the water supply 224 to the deaerator tank 215 and deaerated makeup water passing through the heat exchanger from the deaerator tank to the surge tank 246 should do so as simultaneously as possible so to provide maximum heat transfer between the two fluids. The maintenance of proper fluid level and simultaneous fluid flow occur as follows.

When the deaerated water 260 in the surge tank 246 drops below the preset lower limit, the capacitance level detector 256 signals the deaerator tank filler valve 228 to open allowing makeup water from the water supply 224 to flow to the deaerator tank 215. As the deaerated makeup water 212 in the deaerator tank 215 rises above its predetermined level, the first liquid level switch 230 signals the first surge tank filler valve 236 to open allowing deaerated makeup water 212 to flow from the deaerator tank 215 to the surge tank 246. The second liquid level switch 232 will signal the second surge tank filler valve 238 to open to provide additional flow from the deaerator tank 215 to the surge tank 246 to compensate for pressure variations in the water supply 224.

Once the fluid level in the surge tank 246 reaches the preset upper limit, the capacitance level detector 256 signals the deaerator tank filler valve 228 to be closed. For a short period of time, deaerated makeup water 212 in the deaerator tank 215 continues to flow into the surge tank 246 until both liquid level switches 230 and 232, in sequence, signal the surge tank filler valves 236 and 238 to close. At this time the deaerated makeup water 212 in the deaerator tank 215 is at its predetermined level.

It is envisioned that variations of the above described tank filler mechanisms may be alternatively included. Of import to any variation is that the flow rate of the makeup water flowing from the water supply to the deaerator tank should match as closely as possible the flow rate of the deaerated makeup water flowing from the deaerator tank to the surge tank. Thus, ensuring optimal heat transfer between the two flowing fluids.

The above described embodiments of subject invention will improve overall boiler efficiency. Boiler efficiency is defined as the ratio of energy produced by the boiler to the energy supplied to the boiler. Equipping a boiler with an economizer improves boiler efficiency only when a differential temperature is maintained across the economizer. Because the temperature that the feedwater is heated to when it enters the boiler is constant, the differential temperature across the economizer increases as the temperature of the deaerated feedwater entering the economizer is reduced. Since energy gained from the economizer is free energy, i.e., energy that otherwise would be lost to the atmosphere, overall boiler efficiency is increased as the temperature of the deaerated feedwater entering the economizer is decreased. It is estimated that a 10° F. (5.6° C.) increase in differential temperature across an economizer will produce a one percent increase in overall boiler efficiency. An increase in boiler efficiency directly translates to a decrease in the amount of fuel used by the boiler to obtain the same output and, therefore less polluting emissions expelled into the atmosphere.

By eliminating the step of deaerating the feedwater additional efficiencies are realized since the relatively low temperature condensate produced by efficient hot water heaters does not have to be reheated by the deaerator nozzle. Because prior art feedwater supply systems reheat the condensate in the deaerator nozzle, all of the efficiencies that might be gained by using the hot water heater are lost when the lower temperature condensate passes through the nozzle. In the subject invention, the lower temperature condensate returns to the surge tank and then is pumped by the boiler feed pump directly to the flue gas economizer. This benefit is further compounded since providing the lower temperature condensate further decreases the inlet temperature to the economizer.

An additional economic benefit for eliminating oxygen rich fluid in the surge tank is that the life of the tank is substantially extended since oxidation can not occur. The interconnecting conduits are also spared from premature failure due to corrosion. The tanks and conduit therefore need to be replaced less often.

Another economical benefit for reducing the deaerated makeup water temperature in the preheater is that the density of the feedwater feeding the boiler feed pump is increased, consequently reducing or eliminating pump cavitation. Pump cavitation causes impeller pitting leading to premature bearing and seal damage and ultimately pump failure.

EXAMPLES

All of the examples provided are intended to be illustrative of aspects of the invention. They are not intended to limit the scope or underlying principles of the invention in any way.

Example 1

Oxygen removal through a surge tank vent was determined for a boiler system in which the feedwater and the makeup water are deaerated and for a boiler system in which only the makeup water is deaerated. In this example it is assumed that the boiler system requires a 20% makeup rate. The determination is based on numerical conversions and calculations that are basic in the art and should be readily understood by those so trained. The following assumptions are made:

| | |
|---|---|
| Steam flow rate through the boiler system | 12,000 lbs/hr |
| Temperature of oxygenated makeup water | 55° F. |
| Solubility of oxygen in water at 55° F. | 10 ppm |
| Specific volume of oxygen | 46.25 cu ft/lb |
| Specific volume of steam at 5 psi | 20.37 cu ft/lb |

The example showing oxygen flow rates by each system follows.

| | 100% deaeration | 20% deaeration | units |
|---|---|---|---|
| Lbs makeup water produced/hr | 12,000 | 2,400 | lbs/hr |
| Lbs makeup water produced/yr | 105,120,000 | 21,024,000 | lbs/yr |
| Lbs oxygen produced/yr | 1051 | 210.24 | lbs/yr |
| Volume oxygen produced/yr | 48,619 | 9,724 | cu ft/yr |
| Volume oxygen produced/hr | 5.55 | 1.11 | cu ft/hr |

The flow rate of the vent orifice must be greater than 33 times the flow rate of the oxygen in order to have proper venting of the deaerator tank. Flow rates for ⅜ sq. in. and ¹⁄₁₆ sq. in. orifices at 5 p.s.i. are shown below.

| | Orifice size (sq in) | Flow (lbs/hr) | Flow (cu ft/hr) | Flow (lbs/yr) |
|---|---|---|---|---|
| Standard orifice | ⅜ | 82.573 | 1682.34 | 723,339 |
| Reduced size orifice | ¹⁄₁₆ | 2.2937 | 46.73 | 20,093 |

The ¹⁄₁₆ sq. in. orifice would be sufficiently large enough to remove greater than 33 times the amount of oxygen produced in a boiler system deaerating only 20% of the flow. The efficiency gain can be seen by the reduction of 703,247 lbs of steam vented per year (723,339 lbs/yr−20,093 lbs/yr= 703,247 lbs/yr).

Example 2

Figure 4:
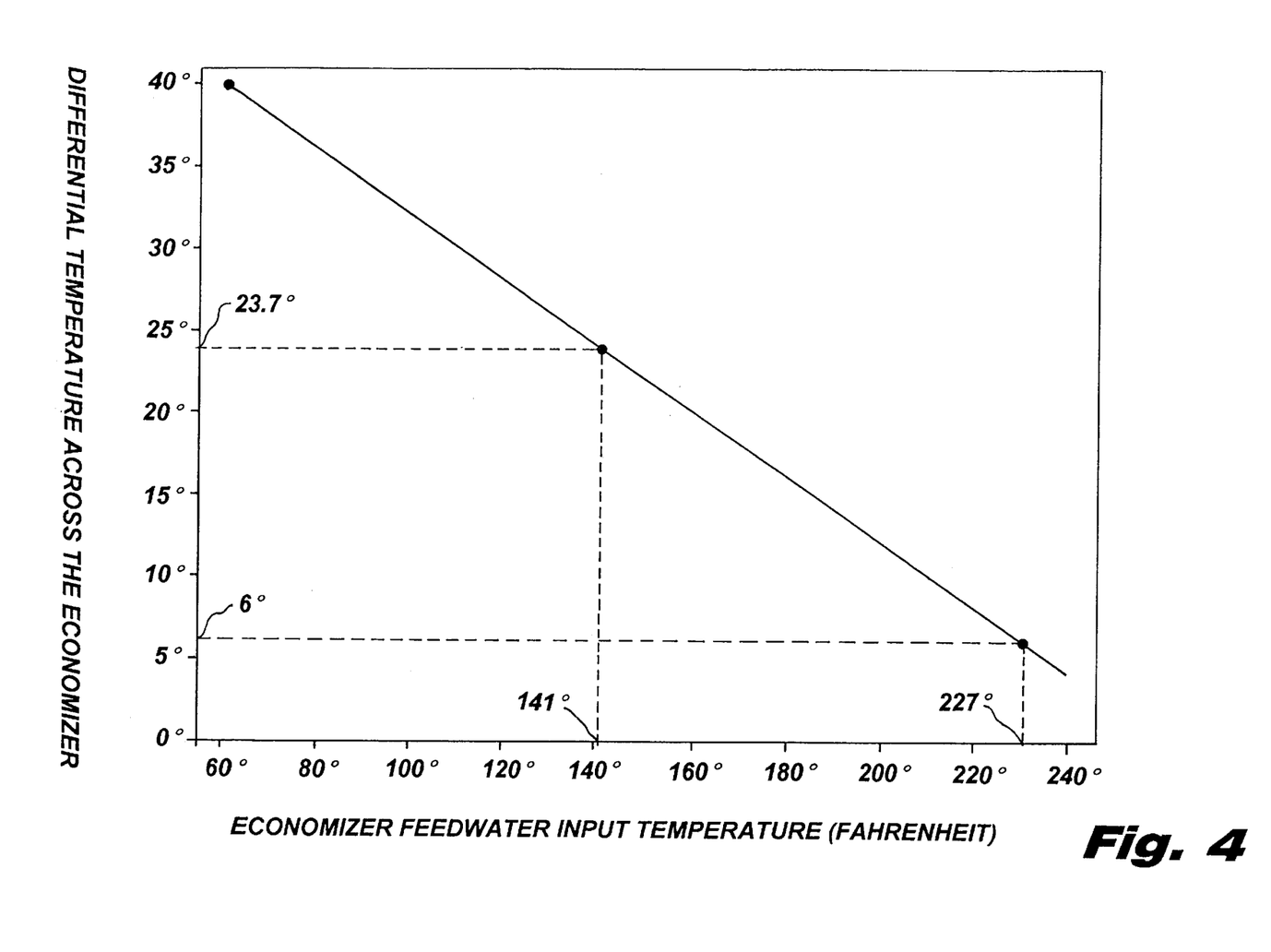
FIG. 4 is a graph showing the differential temperatures across a standard economizer for various economizer feedwater input temperatures.

This example shows the derivation of the increase in boiler efficiency acquired when a boiler previously arranged in the prior art configuration and having an efficiency rate of 80% is reconfigured as a preferred embodiment of the present invention. The following assumptions made were:

| | |
|---|---|
| Percent condensate return to surge tank | 80% |
| Percent makeup water to surge tank | 20% |
| Preheater efficiency | 70% |
| Water Supply temperature | 55° F. |
| Condensate return to surge tank temperature | 150° F. |
| Boiler steam flow rating | 12,000 lbs/hr |
| Weight of water per gallon | 8.33 lbs/gal |
| Prior art economizer inlet temperature | 227° F. |
| Approximate slope of efficiency curve (ref. FIG. 4) | .20 |

The example showing the increase in boiler efficiency follows.

| Step | Calculation | Result |
| --- | --- | --- |
| Amount of condensate returns | (.8 × 12,000) | 9,600 lbs/hr |
| Amount of makeup water | (.2 × 12000) | 2,400 lbs/hr |
| Flow rate through the heat exchanger | (2,400/8.33/60) | 4.8 gals/min |
| Makeup water temp. into the deaerator tank | (55 + (227 − 55) × .7) | 175° F. |
| Makeup water temp into the surge tank | (227 − (227 − 55) × .7) | 107° F. |
| Surge tank temperature or the present invention economizer inlet temp. | (.8 × 150 + .2 × 107) | 141° F. |
| Differential between the prior art and the present invention economizer inlet temp.s | (227 − 141) | 86° F. |
| Differential between the prior art and the present invention economizer outlet temp.s | (86 × .2) | 17.2° F. |
| Percent increase in boiler efficiency | (17.2/10) | 1.7% |

Referring to FIG. 4, a graph is shown allowing graphical determination of the efficiency gain across a flue gas economizer. The slope of the curve was used in the above calculations to determine the differential between the prior art economizer outlet temperature and the present invention economizer outlet temperature. The percent increase in boiler efficiency was based on the general rule that for every 10° F. increase in differential temperature, the boiler efficiency is increased by one percent.

While the invention has been described with respect to a preferred embodiment, those skilled in the art will readily appreciated that various changes and/or modifications can be made to the invention without departing from the spirit or scope of the invention as defined by the appended claims.

What is claimed is:

1. A deaerated feedwater supply system for a boiler system, the feedwater supply system of the type including a deaerator tank configured to contain a volume of deaerated makeup water and a surge tank configured to contain a volume of deaerated feedwater, said feedwater supply system comprising:

a) a water supply conduit operatively configured to provide a supply of water to the deaerator tank;
   b) a deaerated makeup water conduit operatively configured to convey deaerated makeup water from the deaerator tank to the surge tank at an elevation in the surge tank below the surface of deaerated feedwater contained therein so that deaerated makeup water is not exposed to oxygen;
   c) means for exchanging heat from deaerated makeup water conveyed through said deaerated makeup water conduit to water conveyed through said water supply conduit so that the water is heated prior to entering the deaerator tank and the deaerated makeup water is cooled upon entry into the surge tank;
   d) means provided within the surge tank for reducing oxygen absorption into deaerated feedwater;
   e) a deaerated feedwater conduit operatively configured to convey deaerated feedwater to a boiler; and
   f) a condensate return conduit operatively configured to convey condensate return from the boiler to the surge tank at an elevation in the surge tank below the surface of deaerated feedwater contained therein so that condensate return from the boiler is not exposed to oxygen.

2. The deaerated feedwater supply system as recited in claim 1, further comprising a flue gas economizer in fluid communication with said deaerated feedwater conduit and configured to receive flue gasses from the boiler, said economizer functioning to increase overall boiler efficiency by preheating deaerated feedwater before entering the boiler.

3. The deaerated feedwater supply system as recited in claim 1, wherein said oxygen absorption reducing means comprises a multiplicity of spheres that create an oxygen barrier by floating on the surface of the deaerated feedwater in the surge tank.

4. The deaerated feedwater supply system as recited in claim 3, wherein said multiplicity of spheres cover approximately 90% of the surface area of the deaerated feedwater in the surge tank and are manufactured from polypropylene plastic.

5. The deaerated feedwater supply system as recited in claim 1, further comprising means for maintaining the level of deaerated feedwater contained in the surge tank, said means facilitating the conveyance of deaerated makeup water from the deaerator tank to the surge tank when the level of deaerated feedwater in the surge tank falls to a lower limit and interrupting the conveyance of the deaerated makeup water when the level of the deaerated feedwater rises to an upper limit.

6. The deaerated feedwater supply system as recited in claim 5, wherein said feedwater level maintaining means causes water conveyed through said water supply conduit and deaerated makeup water conveyed through said deaerated makeup water conduit to flow simultaneously through said heat exchanging means so that optimal heat transfer occurs between the water and the deaerated makeup water.

7. The deaerated feedwater supply system as recited in claim 5, wherein said feedwater level maintaining means includes:

a) a capacitance level detector operatively associated with the surge tank to detect the level of deaerated feedwater in the surge tank, said capacitance level detector producing a first signal when the deaerated feedwater falls to the lower limit and a second signal when the deaerated feedwater rises to the upper limit;
   b) a deaerator tank valve in fluid communication with said water supply conduit, said valve configured to at least partially open upon receiving said first signal and configured to close upon receiving said second signal as produced by said capacitance level detector;
   c) a liquid level switch in fluid communication with the deaerated makeup water in the deaerator tank and configured to produce a signal when the deaerated makeup water rises above a predetermined level; and
   d) a surge tank valve in fluid communication with said deaerated makeup water conduit, said surge tank valve configured to remain normally closed and configured to at least partially open upon receiving said liquid level switch signal.

8. The deaerated feedwater supply system as recited in claim 1, further comprising a reduced diameter vent orifice operatively mounted to the deaerator tank to allow a measured flow of steam to escape therefrom.

9. A deaerated feedwater supply system for reducing the temperature of deaerated feedwater supplied to a boiler comprising:

a) a deaerator tank configured to deaerate makeup water and containing a predetermined volume of deaerated makeup water;
   b) a water supply conduit configured to provide fluid communication between a water supply and said deaerator tank;

c) a surge tank containing a given volume of deaerated feedwater and having a volume of air above the deaerated feedwater vented to atmosphere;

d) means provided in said surge tank for reducing the amount of oxygen absorption into the deaerated feedwater;

e) a deaerated makeup water conduit configured to convey deaerated makeup water from said deaerator tank to said surge tank at an elevation in said surge tank below said oxygen absorption reducing means so that deaerated makeup water from said deaerator tank is not exposed to oxygen;

f) means for exchanging heat between the deaerated makeup water conveyed through said deaerated makeup water conduit and the water conveyed through said water supply conduit;

g) a boiler supply conduit configured to provide fluid communication between said surge tank and the boiler to provide deaerated feedwater to the boiler; and h) a condensate return conduit operatively configured to provide fluid communication between the boiler and said surge tank at an elevation in said surge tank below said oxygen absorption reducing means so that condensate return from the boiler is not exposed to oxygen.

10. The deaerated feedwater supply system as recited in claim 9, further comprising a flue gas economizer in fluid communication with said boiler supply conduit and configured to receive flue gasses from the boiler, said economizer functioning to increase overall boiler efficiency by preheating deaerated feedwater before entering the boiler.

11. The deaerated feedwater supply system as recited in claim 9, wherein said oxygen absorption reducing means comprises a multiplicity of spheres that create an oxygen barrier by floating on the surface of the deaerated feedwater in said surge tank.

12. The deaerated feedwater supply system as recited in claim 11, wherein said multiplicity of spheres cover approximately 90% of the surface area of the deaerated feedwater in said surge tank and are made of polypropylene plastic.

13. The deaerated feedwater supply system as recited in claim 9, further comprising means for maintaining the level of deaerated feedwater contained in said surge tank, said means facilitating the conveyance of deaerated makeup water from said deaerator tank to said surge tank when the level of deaerated feedwater in said surge tank falls to a lower limit and interrupting the conveyance of the deaerated makeup water when the level of the deaerated feedwater rises to an upper limit.

14. The deaerated feedwater supply system as recited in claim 13, wherein said feedwater level maintaining means causes water conveyed through said water supply conduit and deaerated makeup water conveyed through said deaerated makeup water conduit to flow simultaneously through said heat exchanging means so that optimal heat transfer occurs between the water and the deaerated makeup water.

15. The deaerated feedwater supply system as recited in claim 13, wherein said feedwater level maintaining means includes:

a) a capacitance level detector operatively associated with said surge tank to detect the level of deaerated feedwater in said surge tank, said capacitance level detector producing a first signal when the deaerated feedwater falls to the lower limit and a second signal when the deaerated feedwater rises to the upper limit;

b) a deaerator tank valve in fluid communication with said water supply conduit, said valve configured to at least partially open upon receiving said first signal and configured to close upon receiving said second signal as produced by said capacitance level detector;

c) a liquid level switch in fluid communication with the deaerated makeup water in said deaerator tank and configured to produce a signal when the deaerated makeup water rises above a predetermined level; and d) a surge tank valve in fluid communication with said deaerated makeup water conduit, said surge tank valve configured to remain normally closed and configured to at least partially open upon receiving said liquid level switch signal.

16. The deaerated feedwater supply system as recited in claim 9, further comprising a reduced diameter vent orifice operatively mounted to said deaerator tank to allow a measured flow of steam to escape therefrom.

17. A method for deaerating boiler system feedwater, the boiler system including a water supply, a deaerator tank configured to deaerate and contain deaerated water, a vented surge tank configured to contain deaerated water, and a boiler, the method comprising the steps of:

a) conveying water from the water supply to the deaerator tank;

b) conveying deaerated water from the deaerator tank to the surge tank at an elevation below the surface of the deaerated water contained therein so to prevent exposure of the deaerated water to the vented area in the surge tank;

c) preheating the water conveyed from the water supply to the deaerator tank with the deaerated water conveyed from the deaerator tank to the surge tank so that the water is heated prior to entering the deaerator tank and the deaerated makeup water is cooled when it enters the surge tank;

d) reducing oxygenation of the deaerated water contained in the surge tank;

e) conveying deaerated water from the surge tank to the boiler; and f) conveying boiler condensate return from the boiler to the surge tank at an elevation below the surface of the deaerated water contained in the surge tank so as to prevent the exposure of the condensate return to the vented area in the surge tank.

18. The feedwater deaeration method as recited in claim 17, further comprising the step of causing simultaneous flow of the water conveyed from the water supply to the deaerator tank and the deaerated water conveyed from the deaerator tank to the surge tank so that optimal heat transfer occurs between the water and the deaerated water.

19. The feedwater deaeration method as recited in claim 17, further comprising the step of preheating the deaerated water conveyed from the surge tank to the boiler with boiler flue gases so to improve the overall efficiency of the boiler by drawing off heat therefrom.

20. A method for deaerating boiler system feedwater, the boiler system including a water supply, a deaerator tank configured to deaerate and contain deaerated water, a vented surge tank configured to contain deaerated water, and a boiler, the method comprising the steps of:

a) controlling the flow of water from the water supply to the deaerator tank;

b) controlling the flow of deaerated water from the deaerator tank to the surge tank at an elevation below the surface of the deaerated water contained in the surge tank so to prevent exposure of the deaerated water to the vented area in the surge tank;

c) preheating the water conveyed from the water supply to the deaerator tank with the deaerated water conveyed from the deaerator tank to the surge tank so that the water is heated prior to entering the deaerator tank and the deaerated makeup water is cooled when it enters the surge tank;

d) reducing oxygenation of the deaerated water contained in the surge tank;

e) conveying deaerated water from the surge tank to the boiler; and f) conveying boiler condensate return from the boiler to the surge tank at an elevation below the surface of the deaerated water contained in the surge tank so as to prevent the exposure of the condensate return to the vented area in the surge tank.

21. The feedwater deaeration method as recited in claim 20, further comprising the step of developing simultaneous flow of the water controlled to flow from the water supply to the deaerator tank and the deaerated water controlled to flow from the deaerator tank to the surge tank so that optimal heat transfer occurs between the water and the deaerated water.

22. The feedwater deaeration method as recited in claim 21, wherein the step of developing simultaneous flow of water and deaerated water comprises the steps of:

a) monitoring the level of deaerated water contained in the surge tank;

b) directing the water in the water supply to flow to the deaerator tank when the deaerated water in the surge tank falls to a lower limit;

c) directing the deaerated water in the deaerator tank to flow to the surge tank once the deaerated water in the deaerator tank begins to rise above a predetermined level;

d) directing the water in the water supply to discontinue flowing to the deaerator tank once the deaerated water in the surge tank rises to an upper limit; and e) directing the deaerated water in the deaerator tank to discontinue flowing to the surge tank once the deaerated water in the deaerator tank falls to the predetermined level.

23. A deaerated feedwater supply system including a deaerator tank configured to contain deaerated makeup water and a surge tank configured to contain deaerated feedwater, said system comprising:

a water supply conduit operatively configured to provide water to the deaerator tank;

a deaerated makeup water conduit operatively configured to convey deaerated makeup water from the deaerator tank to the deaerated feedwater in the surge tank;

a heat exchanger operatively associated with said water supply conduit and said deaerated makeup water conduit; and a barrier on the surface of the deaerated feedwater in the surge tank.

24. The deaerated feedwater supply system as recited in claim 23, further comprising a deaerated feedwater conduit operatively configured to convey deaerated feedwater from the surge tank to a boiler and a condensate return conduit operatively configured to convey condensate return from the boiler to the deaerated feedwater in the surge tank.

25. The deaerated feedwater supply system as recited in claim 24, further comprising a flue gas economizer in fluid communication with said deaerated feedwater conduit and configured to receive flue gasses from the boiler.

26. The deaerated feedwater supply system as recited in claim 23, wherein said barrier is defined by a multiplicity of spheres.

27. The deaerated feedwater supply system as recited in claim 23, further comprising a filler valve in fluid communication with said deaerated makeup water conduit and operably controlled by a liquid level detector which senses the level of deaerated makeup water in the deaerator tank.

28. The deaerated feedwater supply system as recited in claim 27, further comprising a filler valve in fluid communication with said water supply conduit and operably controlled by a liquid level detector which senses the level of deaerated feedwater in the surge tank.

29. The deaerated feedwater supply system as recited in claim 23, further comprising a vent orifice operatively mounted to the deaerator tank.

30. A deaerated feedwater supply system comprising:

a deaerator tank configured to deaerate makeup water and containing a volume of deaerated makeup water;

a water supply conduit configured to provide fluid communication between a water supply and said deaerator tank;

a surge tank containing a given volume of deaerated feedwater;

a barrier on the surface of the deaerated feedwater in the surge tank;

a deaerated makeup water conduit configured to convey deaerated makeup water from said deaerator tank to the deaerated feedwater in said surge tank; and a heat exchanger operatively associated with said water supply conduit and said deaerated makeup water conduit.

31. The deaerated feedwater supply system as recited in claim 30, further comprising a deaerated feedwater conduit operatively configured to convey deaerated feedwater from said surge tank to a boiler, and a condensate return conduit operatively configured to convey condensate return from the boiler to the deaerated feedwater in said surge tank.

32. The deaerated feedwater supply system as recited in claim 31, further comprising a flue gas economizer in fluid communication with said deaerated feedwater conduit and configured to receive flue gasses from the boiler.

33. The deaerated feedwater supply system as recited in claim 30, wherein said barrier is defined by a multiplicity of spheres.

* * * * *